(12) United States Patent
Yanagisawa

(10) Patent No.: US 6,327,929 B1
(45) Date of Patent: Dec. 11, 2001

(54) TWO DIMENSIONAL DRIVE SYSTEM

(76) Inventor: Ken Yanagisawa, c/o Kabushiki Kaisha Mechanic Sekkei Jimusho, 5175-1, Ooaza Toyoshina, Toyoshina-machi, Minamiazumi-gun, Nagano 399-8205 (JP)

( * ) Notice: Subject to any disclaimer, the term of this patent is extended or adjusted under 35 U.S.C. 154(b) by 0 days.

(21) Appl. No.: 09/500,572

(22) Filed: Feb. 10, 2000

(30) Foreign Application Priority Data

Feb. 12, 1999 (JP) .................................................. 11-034212

(51) Int. Cl.[7] .................................................. G06G 11/00
(52) U.S. Cl. ..................... 74/490.09; 33/1 M; 74/89.33; 108/143; 248/657; 248/661; 384/45
(58) Field of Search .................. 74/89.33, 490.09, 74/490.13; 33/1 M; 108/143; 384/45; 248/657, 661

(56) References Cited

U.S. PATENT DOCUMENTS

| | | | |
|---|---|---|---|
| 2,692,377 | * 10/1954 | Brettell, Jr. | ........................... 340/990 |
| 4,648,724 | * 3/1987 | Sugiyama et al. | ........................ 384/9 |
| 5,279,178 | * 1/1994 | Yanagisawa | ........................ 74/490.09 |
| 5,311,791 | 5/1994 | Yanagisawa . | |
| 5,481,936 | * 1/1996 | Yanagisawa | ........................ 74/490.06 |
| 5,760,564 | * 6/1998 | Novak | ................................. 318/687 |

FOREIGN PATENT DOCUMENTS 5-92376   4/1993   (JP) .

* cited by examiner

Primary Examiner—Allan D. Herrmann

(57) ABSTRACT

The two dimensional drive system is capable of properly supporting a load applied to a slider and improving the positioning accuracy, the resolution, etc. The drive system comprises: a base; a pair of first fixed guides; a pair of second fixed guides; a first moving beam being capable of moving in the first direction; a second moving beam being capable of moving in the second direction; a slider being capable of moving along the first moving beam and the second moving beam; a first ball screw for moving the slider in the first direction; a second ball screw for moving the slider in second direction; first driving means for driving the first ball screw; second driving means for driving the second ball screw; and a third fixed guide being fixed between the first fixed guides and slidably connected to the first moving beam, whereby the third fixed guide guides the first moving beam in the first direction.

13 Claims, 7 Drawing Sheets

TWO DIMENSIONAL DRIVE SYSTEM

BACKGROUND OF THE INVENTION

The present invention relates to a two dimensional drive system.

An X–Y table, which is an example of conventional two-dimensional drive system, comprises: a base; an X-driving unit being arranged in an X-direction, fixed to the base, and capable of moving an X-moving body, in the X-direction, by an X-driving means; a Y-driving unit being arranged in a Y-direction, fixed to the X-moving body, moved together with the X-moving body in the X-direction, and capable of moving a Y-moving body, in a Y-direction, by a Y-driving means; and a top table being fixed on the Y-moving body.

In the conventional X–Y table, the top table, which is fixed to the Y-moving body, is directly moved, in the Y-direction, by the Y-driving means; the top table is indirectly moved, in the X-direction, by moving the Y-driving unit by the X-driving means.

A first point of the X-driving means, at which driving force of the X-driving means, which moves the Y-driving unit in the X-direction, is generated, and a second point, to which the driving force thereof works so as to move the Y-driving unit in the X-direction, in the top table, are separated. By the distance between the first and second points, moment is generated in the system and it badly influences positioning accuracy, resolution, inertia reductively and high speed operation ability.

In the conventional X–Y table, the Y-driving unit is piled on the X-driving unit, further the top table is piled on the Y-driving unit. With this structure, the weight of the top table fully works to the Y-driving unit, so that the Y-driving unit is bent and the positioning accuracy, etc. are made lower.

The inventor of the present invention invented a two dimensional drive system, and it was disclosed in Japanese Patent Gazette No. 5-92376, in which a moving body (slider) is moved in a first (X) direction and a second (Y) direction, which is perpendicular to the first (X) direction, by two ball screws.

The conventional two-dimensional drive system is shown in FIG. 10. The system comprises: a base 110; a pair of X-guides 114a and 114b being fixed to the base 110 and arranged in the X-direction; a pair of Y-guides 126a and 126b being fixed to the base 110 and arranged in the Y-direction; a pair of X-travelers 116a and 116b being capable of moving, in the X-direction, along the X-guides 114a and 114b; a pair of Y-travelers 128a and 128b being capable of moving, in the Y-direction, along the Y-guides 126a and 126b; an X-ball screw 134 being arranged in the X-direction and spinably spanned between the Y-travelers 128a and 128b; a Y-ball screw 138 being arranged in the Y-direction and spinnably spanned between the X-travelers 116a and 116b; a slider 142 being screwed with the X- and Y-ball screws 134 and 138 and capable of moving in the X- and Y-directions when the X-and Y-ball screws 134 and 138 spin; an X-servo motor 136 for spinning the X-ball screw 134; a Y-servo motor 140 for spinning the Y-ball screw 138; a pair of X-racks 112a and 112b being arrange, in the X-direction, alongside the X-guides 114a and 114b; a pair of Y-racks 124a and 124b being arrange, in the Y-direction, along side the Y-guides 126a and 126b; an X-rod 132 being rotatably arranged in the X-direction and capable of moving, in the Y-direction, with the movement of the Y-travellers 128a and 128b; a Y-rod 120 being rotatably arranged in the Y-direction and capable of moving, in the X-direction, with the movement of the X-travellers 116a and 116b; a pair of X-pinion gears 133a and 133b being coaxially fixed to the X-rod 132, respectively engaged with the Y-racks 124a and 124b and capable of rolling, in the Y-direction, with the movement of the X-rod 132; and a pair of Y-pinion gears 122a and 122b being coaxially fixed to the Y-rod 120, respectively engaged with the X-racks 112a and 112b and capable of rolling, in the X-direction, with the movement of the Y-rod 120.

In the two dimensional drive system, the slider 142, which corresponds to the top table of the X–Y table, can be directly moved, in the X- and Y-directions, by the X- and Y-ball screws 134 and 138. Namely, the first point and the second point are met and the slider 142 can be directly driven by the ball screws 134 and 138, so that the resolution of the ball screws 134 and 138 can be directly mirrored to the resolution of the slider 142. Namely, the positioning accuracy, etc. of the slider 142 can be improved.

The slider 142 is supported by not only the guides 114a, 114b, 126a and 126b but also an X-slider guide 130 and a Y-slider guide 118. With this structure, deformation of the beam-shaped slider guides 130 and 118 can be limited, so that the positioning accuracy, etc. can be improved.

Further, the slider 142 can be moved in a hollow space, an operator can efficiently work in the hollow space.

However, in the case of using the two-dimensional drive system as an X–Y table, the slider guides 118 and 130 are bent and a level of the slider 142 is made lower, if a heavy thing is mounted onto the slider 142. If the level of the slider 142 is made lower, the positioning accuracy, etc. of the drive system is made lower.

On the other hand, in the conventional X–Y table, the X-driving unit is fixed to the base, and manufacturing accuracy of a surface of the base influences to the positioning accuracy of the top table. Thus, the positioning accuracy of the X–Y table cannot be improved without improving the manufacturing accuracy of the surface of the base.

SUMMARY OF THE INVENTION

An object of the present invention is to provide a two-dimensional drive system, which is capable of properly supporting a load applied to a slider and improving the positioning accuracy, the resolution, the inertia reductively, the high speed ability, etc.

Another object of the present invention is to provide a two dimensional drive system, which is capable of improving the positioning accuracy of the slider without improving the manufacturing accuracy and capable of reducing manufacturing cost.

To achieve the objects, the two dimensional drive system of the present invention comprises:

a base;

a pair of first fixed guides being fixed to the base and arranged parallel in a first direction;

a pair of second fixed guides being fixed to the base and arranged parallel in a second direction perpendicular to the first direction;

a first moving beam being parallel to the second fixed guides, both ends of the first moving beam being respectively slidably connected to the first fixed guides, whereby the first moving beam can be moved in the first direction;

a second moving beam being parallel to the first fixed guides, the second moving beam being located on the outer side of the first moving beam with respect to the base, both ends of the second moving beam being respectively slidably connected to the second fixed guides, whereby the second moving beam can be moved in the second direction;

a slider being located on the outer side of the first moving beam with respect to the base, the slider being slidably connected to the first and second moving beams, whereby the slider can be moved, in the second direction, along the first moving beam and moved, in the first direction, along the second moving beam;

a first ball screw being spinnably provided to the second moving beam and arranged in the first direction, the first ball screw being screwed with the slider so as to move the slider in first direction;

a second ball screw being spinnably provided to the first moving beam and arranged in the second direction, the second ball screw being screwed with the slider so as to move the slider in second direction;

first driving means for spinning the first ball screw;

second driving means for spinning the second ball screw; and a third fixed guide being fixed to the base, the third fixed guide being arranged parallel to and between the first fixed guides, the third fixed guide being located on the inner side of the first moving beam with respect to the base and slidably connected to the first moving beam, whereby the third fixed guide guides the first moving beam in the first direction.

The third fixed guide is fixed to the base, arranged parallel to and between the first fixed guides, located on the inner side of the first moving beam with respect to the base and slidably connected to the first moving beam. With this structure, the third fixed guide can properly support a load applied to the slider, so that the two dimensional drive system of the present invention is capable of properly supporting the load and improving the positioning accuracy, the resolution, the inertia reductively, the high speed ability, etc.

The two dimensional drive system may further comprise:

first connecting means for slidably connecting the first moving beam with the first fixed guides and the third fixed guide; and second connecting means for slidably connecting the second moving beam with the second fixed guides, wherein the connecting means may be linear guides, each of which includes a linear rail, a moving block being moved along the linear rail and a plurality of balls being provided between the linear rail and the moving block so as to precisely move the moving block, and wherein the fixed guides may act as the linear rails of the linear guides, and the moving blocks may be respectively fixed to the moving beams. With this structure, slidability of the moving beams can be improved, the moving beams can be moved smoothly, and the positioning accuracy of the system can be improved.

In the two dimensional drive system, a plurality of the third fixed guides may be provided between the first fixed guides. With this structure, a greater load or a heavy weight can be properly supported, so that the positioning accuracy of the system can be improved.

In the two dimensional drive system, a connecting mechanism, which slidably connects the first and second moving beams with the slider, may include:

a first rail section being provided on one face of the first moving beam, which faces opposite direction with respect to a face facing the base, the first rail section being extended in the second direction;

a second rail section being provided on one face of the second moving beam, which faces the base, the second rail section being extended in the first direction;

a first connecting section being provided on one face of the slider, which faces the base, the first connecting section being connected with the first rail section; and a second connecting section being provided on one face of the slider, which faces opposite direction with respect to a face facing the base, the second connecting section being connected with the second rail section. With this structure, length of a piled portion of the first and second ball screws and length of a piled portion of the rail sections of the first and second moving beams are very short, so that influences of moment can be reduced, the positioning accuracy, etc. of the drive system can be improved. Further, thickness of the drive system can be thinner.

The two dimensional drive system may further comprise:

connecting means for slidably connecting the first and second moving beams with the slider, wherein the connecting means is a linear guide, which includes a first linear rail, a second liner rail, a moving block being moved along the linear rails and a plurality of balls being provided between the linear rails and the moving block so as to precisely move the moving block, and wherein the first rail is fixed to the first moving beam and extended in the second direction, the second rail is fixed to the second moving beam and extended in the first direction, and the moving block is fixed to the slider and connected to the linear rails. With this structure, slidability of the slider can be improved, the slider can be moved smoothly, and the positioning accuracy of the system can be improved.

The two dimensional drive system may further comprise:

first synchronizng means for synchronizng movement of the both ends of the first moving beam along the first fixed guides; and second synchronizng means for synchronizng movement of the both ends of the second moving beam along the second fixed guides. With this structure, the positioning accuracy of the drive system can be improved even if the drive system is large and heavy.

The two dimensional drive system may further comprise an X–Y table, whose top table is fixed to an upper part of the slider, which is located above the base and capable of moving in the first and second directions. With this structure, the X–Y table having higher performances can be produced.

Another two dimensional drive system of the present invention comprises:

a base;

a pair of first fixed guides being fixed to the base and arranged parallel in a first direction;

a pair of second fixed guides being fixed to the base and arranged parallel in a second direction perpendicular to the first direction;

a first moving beam being parallel to the second fixed guides, both ends of the first moving beam being respectively slidably connected to the first fixed guides, whereby the first moving beam can be moved in the first direction;

a second moving beam being parallel to the first fixed guides, the second moving beam being located on the outer side of the first moving beam with respect to the base, both ends of the second moving beam being respectively slidably connected to the second fixed guides, whereby the second moving beam can be moved in the second direction;

a slider being located on the outer side of the first moving beam with respect to the base, the slider being slidably connected to the first and second moving beams, whereby the slider can be moved, along the first and second moving beams, in the first and second directions; and a third fixed guide being fixed to the base, the third fixed guide being arranged parallel to and between the first fixed guides, the third fixed guide being located on the inner side of the first moving beam with respect to the base base and slidably connected to the first moving beam, whereby the third fixed guide guides the first moving beam in the first direction, wherein the connecting means are linear guides, each of which includes a linear rail, a moving block being moved along the linear rail and a plurality of balls being provided between the linear rail and the moving block so as to precisely move the moving block, and wherein the fixed guides act as the linear rails of the linear guides, and the moving blocks are respectively fixed to the moving beams.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
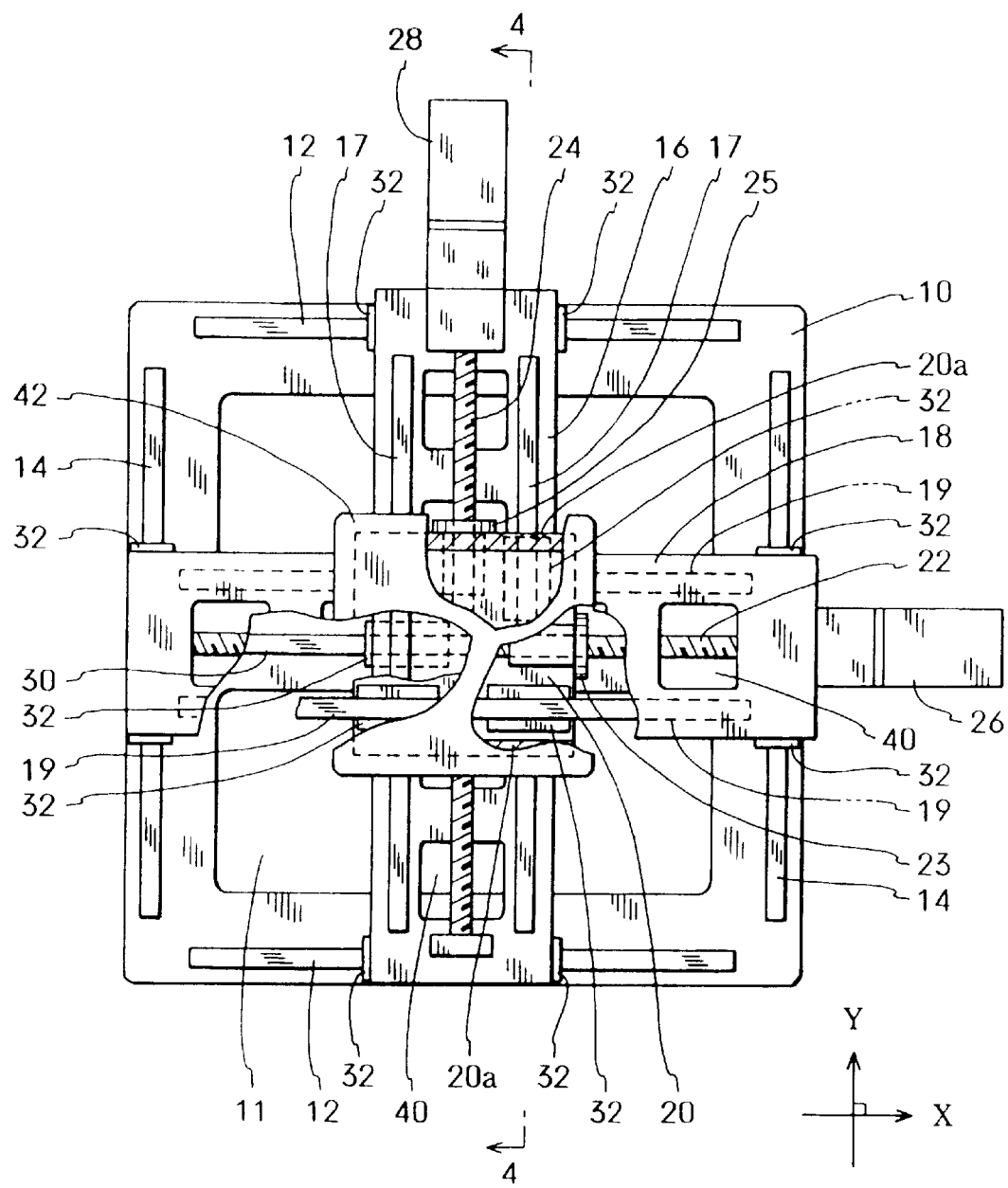
FIG. 1 is a plan view of an embodiment of the two dimensional drive system of the present invention.
Figure 2:
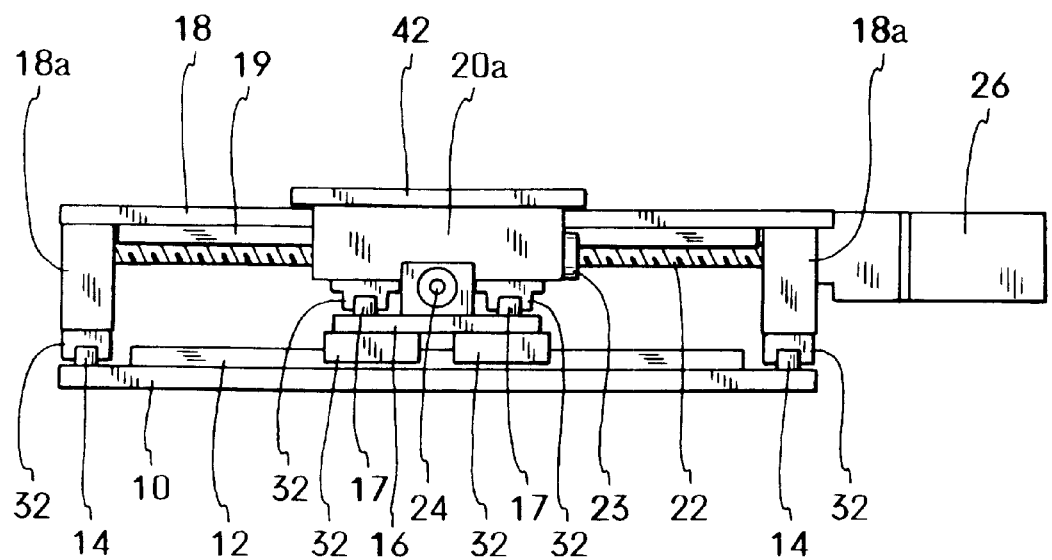
FIG. 2 is a front view of the embodiment shown in FIG. 1.
Figure 3:
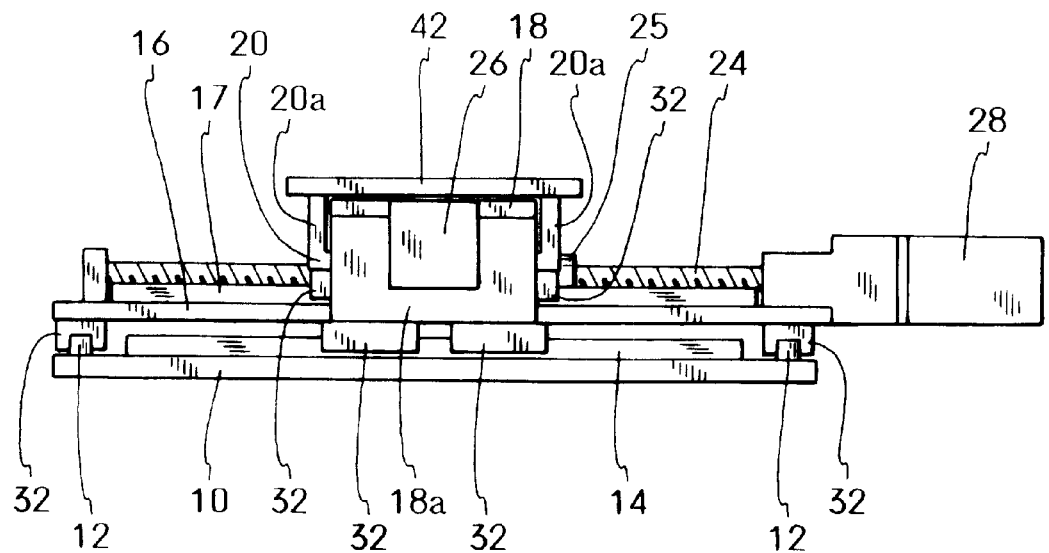
FIG. 3 is a side view of the embodiment shown in FIG. 1.
Figure 4:
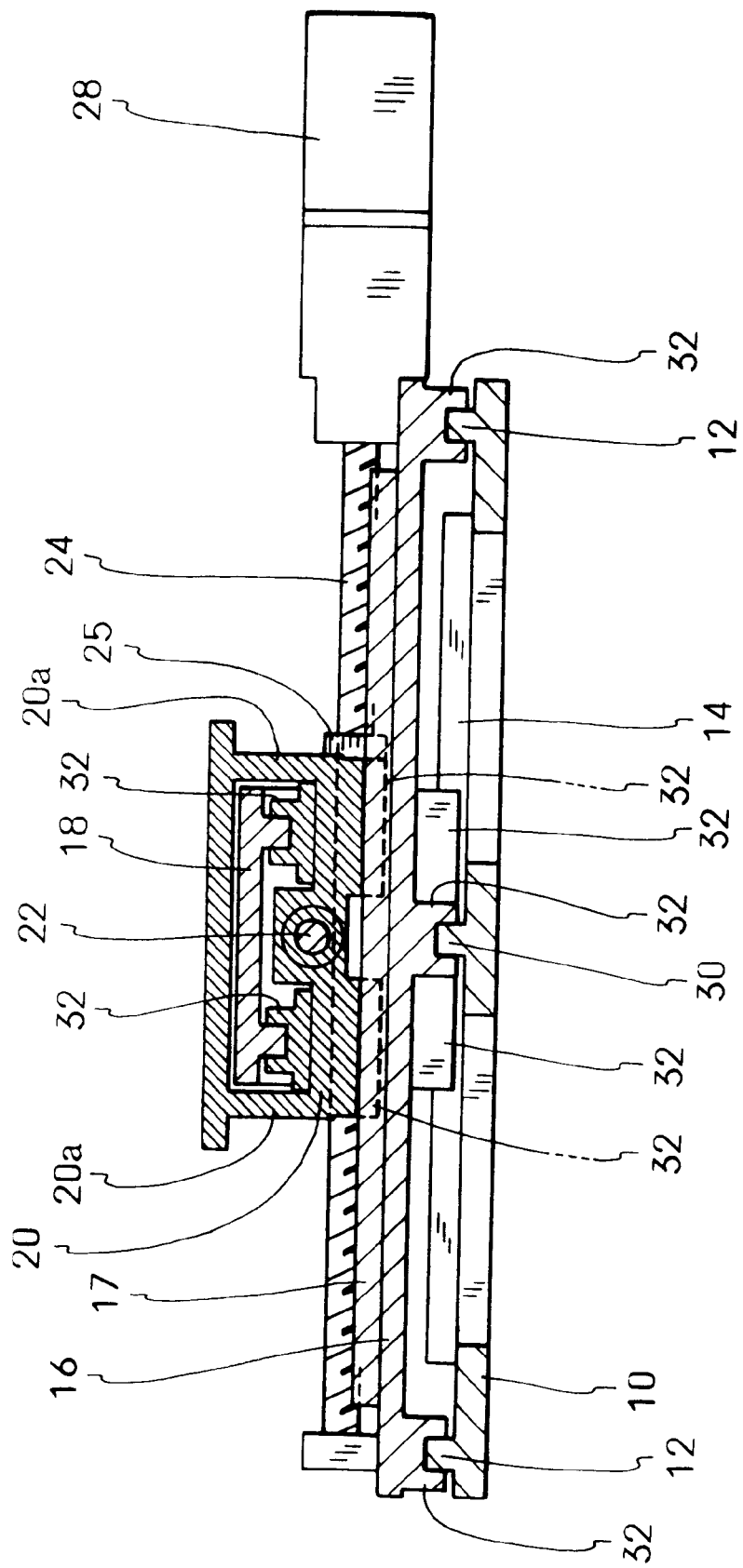
FIG. 4 is a sectional view of the embodiment shown in FIG. 1 taken along the like 4–4.

FIG. 1 is a plan view of an embodiment of the two dimensional drive system of the present invention; FIG. 2 is a front view of the embodiment shown in FIG. 1; FIG. 3 is aside view of the embodiment shown in FIG. 1; FIG. 4 is a sectional view of the embodiment shown in FIG. 1 taken along a line 4–4. The two dimensional drive system of the embodiment is an X–Y table. Note that, in the present embodiment, a first direction is a direction of an X-axis; a second direction is a direction of a Y-axis perpendicular to the X-direction.

A base 10 is provided in a lower part of the two dimensional drive system and acts as a base section of the X–Y table.

A pair of X-fixed guides 12 are fixed on an upper face of the base 10 and arranged parallel in the X-direction with a proper separation.

A pair of Y-fixed guides 14 are fixed on the upper face of the base 10 and arranged parallel in the Y-direction with a proper separation.

An X-moving beam 16 is arranged parallel to the Y-fixed guides 14. Both ends of the X-moving beam 16 are respectively slidably connected to the X-fixed guides 12, so that the X-moving beam 16 can be moved, in the X-direction, along the X-fixed guides 12.

A Y-moving beam 18 is arranged parallel to the X-fixed guides 12. Both ends of the Y-moving beam 18 are respectively slidably connected to the Y-fixed guides 14, so that the Y-moving beam 18 can be moved, in the Y-direction, along the Y-fixed guides 14.

In the present embodiment, first connecting means slidably connects the X-moving beam 16 with the X-fixed guides 12; second connecting means slidably connects the Y-moving beam 18 with the Y-fixed guides 14. The first and second connecting means are linear guides 31 (see FIGS. 7 and 8), each of which includes a linear rail 36, a moving block 32 being moved along the linear rail 36 and a plurality of balls 34 being provided between the linear rail 36 and the moving block 32 so as to precisely move the moving block 32. The fixed guides 12 and 14 act as the linear rails 36 of the linear guides 31. The moving blocks 32 of the linear guides 31 are respectively fixed to the moving beams 16 and 18. With this structure, the moving beams 16 and 18 can be smoothly moved. Further, elasticity of the balls 34 can uniformly disperse a load, so that the drive system can be stably operated with high accuracy.

Figure 7:
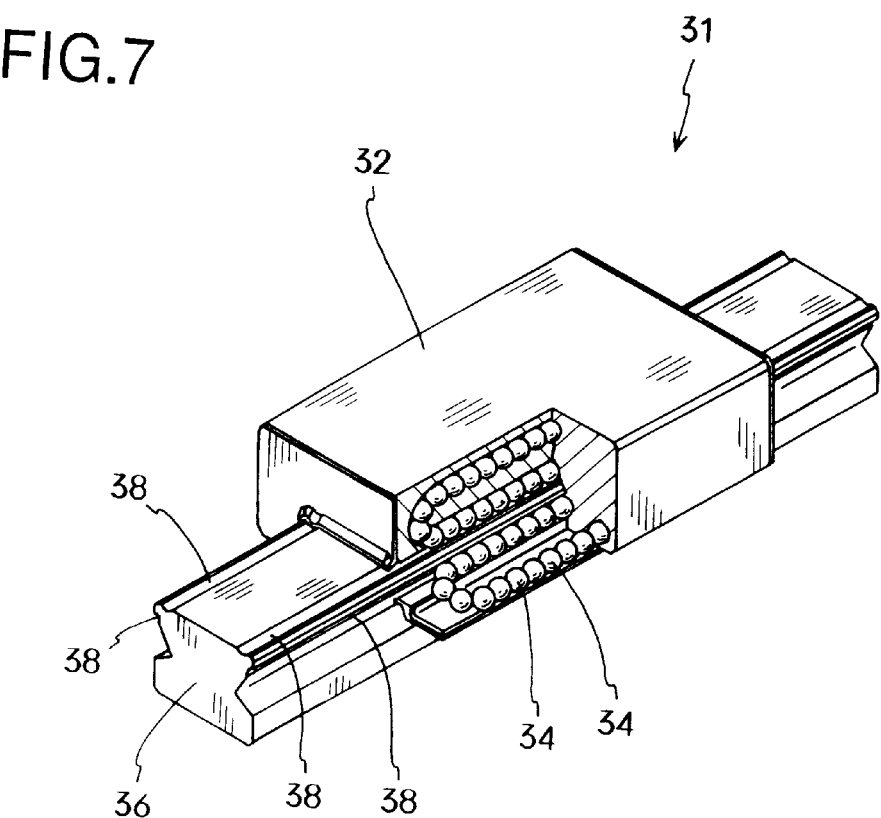
FIG. 7 is a perspective view of a linear guide.
Figure 8:
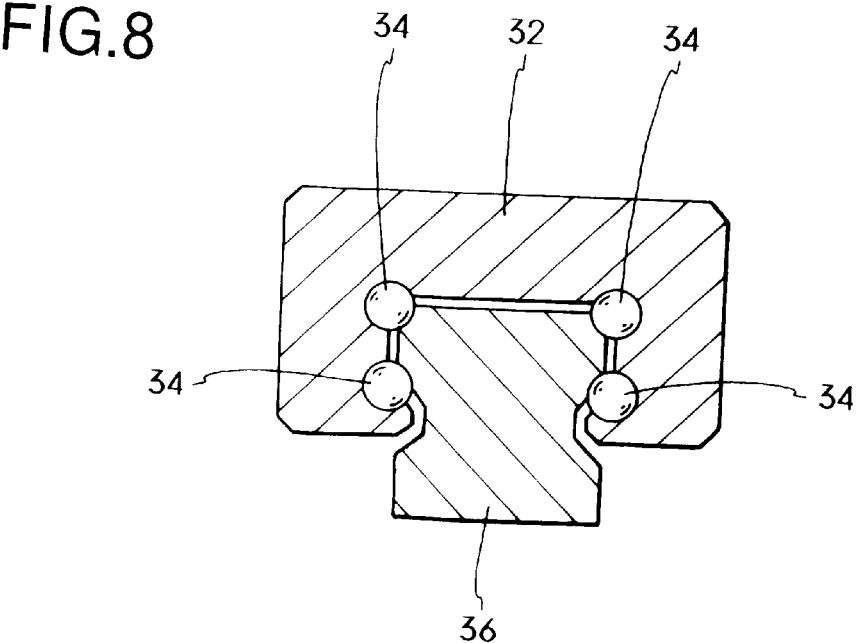
FIG. 8 is a sectional view of the linear guide.

A perspective view of the linear guide 31 is shown in FIG. 7; a sectional view thereof is shown in FIG. 8. A known linear guide, e.g., LM Guide (trade name, manufactured by THK Corporation whose head office is located at 3-11-6, Nishi-Gotanda, Shinagawa-ku, Tokyo, Japan), may be employed as the linear guide 31.

A structure and function of the linear guide 31 will be explained with reference to FIGS. 7 and 8.

A sectional shape of the rail 36 is formed into a dove tail shape, and four receiving faces 38, each of which is formed like a shallow groove, are extended in the longitudinal direction. Four groups of the balls 34 are built in the moving block 32. The balls 34 in each group are circulated along a loop track in the moving block 32.

The balls 34 roll on the receiving faces 38, so that the moving body 32 can be smoothly moved at high speed.

By the elasticity and load dispersion of the balls 34, linearity of the linear movement of the moving block 32 can be higher without reference to a surface condition of a surface on which the rail 36 is fixed. As shown in FIG. 8, the balls 34 contact four parts of the rail 36, so the linearity can be improved not only in the vertical direction but also in the right-left direction.

A slider 20 is slidably connected with the X- and Y-moving beams 16 and 18. The slider 20 is located on an outer (upper) side of the X-moving beam 16 with respect to the base 10. The slider 20 is moved, in the Y-direction, along the X-moving beam 16; the slider 20 is moved, in the X-direction, along the Y-moving beam 18.

In the present embodiment, connecting means slidably connects the X- and Y-moving beams 16 and 18 with the slider 20. The connecting means is also the linear guide 31 (see FIGS. 7 and 8), which includes the rails 36 being respectively fixed to the moving beams 16 and 18, the moving block 32 being moved along the linear rails and a plurality of the balls 34 for precisely moving the moving block. The moving block 32 is fixed to the slider 20. Namely, Y-rails 17 are arranged in the Y-direction and fixed on an upper face of the X-moving beam 16 so as to guide the slider 20 in the Y-direction; X-rails 19 are arranged in the X-direction and fixed on a lower face of the Y-moving beam 18 so as to guide the slider 20 in the Xdirection. With this structure, the slider 20 can be smoothly moved, and the linearity of the linear movement of the slider 20 can be higher due to the elasticity and the load dispersion of the balls 34.

An X-ball screw 22 is provided to the Y-moving beam 18 and spinnably arranged in the X-direction. The X-ball screw 22 is screwed with a nut 23, which is fixed to the slider 20, so as to move the slider 20 in the X-direction.

A Y-ball screw 24 is provided to the X-moving beam 16 and spinnably arranged in the Y-direction. The Y-ball screw 24 is screwed with a nut 25, which is fixed to the slider 20, so as to move the slider 20 in the Y-direction.

An X-servo motor 26, which is an example of first driving means, spins the X-ball screw 22. The X-servo motor 26 is fixed to the Y-moving beam 18.

A Y-servo motor 28, which is an example of second driving means, spins the Y-ball screw 24. The Y-servo motor 28 is fixed to the X-moving beam 16.

The X- and Y-servo motors 26 and 28 are controlled by a computer, so the position of the slider 20 can be precisely controlled by controlling the rotation of the X- and Y-ball screws 22 and 24.

A third fixed guide 30 is fixed to the base 10 and provided between the X-fixed guides 12. The third fixed guide 30 is arranged parallel to the X-fixed guides 12. A part of the X-moving beam 16, which is located on the base 10 side, is slidably connected with the third fixed guide 30, so that the third fixed guide 30 guides the X-moving beam 16 in the X-direction.

Connecting means slidably connects the X-moving beams 16 with the third fixed guide 30. The connecting means is also the linear guide 31 (see FIGS. 7 and 8), which includes the rail 36, the moving block 32 being moved along the linear rail and a plurality of the balls 34 for precisely moving the moving block. The third fixed guide 30 acts as the rail 36 of the linear guide 31, and the moving block 32 is fixed to the X-moving beam 16.

The third fixed guide 30 also can receive and support the load applied to the slider 20 at a center part of the base 10, which is enclosed by the X-fixed guides 12 and the Y-fixed guides 14. The weight of the slider 20 and the load applied to the slider 20 can be properly received and supported by the X-fixed guides 12, the Y-fixed guides 14 and the third fixed guide 30, so that the drive system has high performance and high durability.

In the present embodiment, one third fixed guide 30 is provided, but the number is not limited to one, so a plurality of the third fixed guides 30 may be provided between the X-fixed guides 12.

By increasing number of the third fixed guides 30, the weight of the slider 20 and the load applied to the slider 20 can be dispersed more, so that the linearity, positioning accuracy, etc. of the slider 20 can be highly improved.

Especially, the effect of the load dispersion can be improved by increasing number of the third fixed guides 30.

Next, a vertical arrangement of the structural elements of the drive system will be explained.

In the present embodiment, the drive system is used as the X-Y table, so the base 10 is provided to the lowest part.

Figure 5:
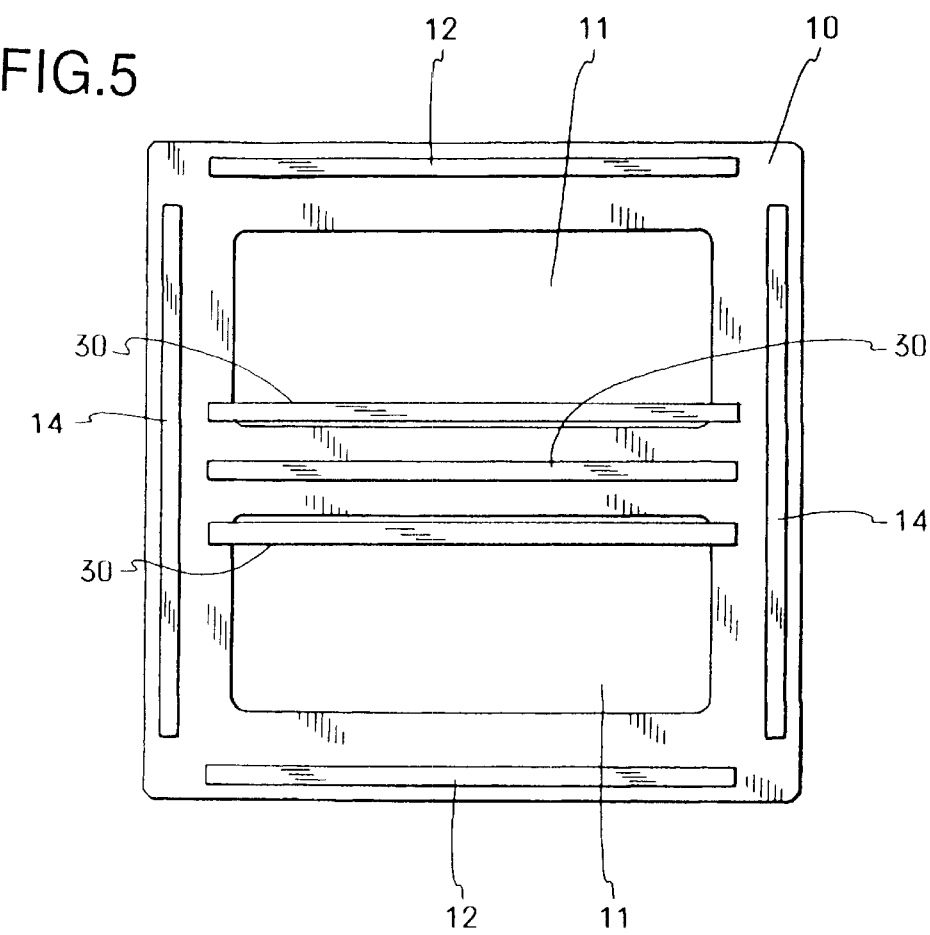
FIG. 5 is a plan view of the embodiment shown in FIG. 1 showing arrangement of fixed guides on a base.

As shown in FIG. 5, the fixed guides 12, 14 and 30 are fixed on the upper face of the base 10. A through-hole 11 of the base 11 allows a clean down flow, which falls from a ceiling of a clean room, to pass downward so as to keep the clean condition of the room. Through-holes 40 of the X- and the Y-beams 16 and 18 also allow the down flow to pass downward. And the through-holes 40 reduce the weight of the X- and Y-beams 16 and 18, so that the inertia can be reduced.

In the present embodiment, number of the moving blocks 32 of the linear guides 31, which are slidably connected with the X-fixed guides 12 and the third fixed guide 30, are six, and they are divided in three groups, in each of which two moving blocks 32 are serially arranged. The moving blocks 32 are fixed on a bottom face of the X-moving beam 16.

A pair of the Y-rails 17 are fixed on the upper face of the X-moving beam 16, so they do not face the base 10; a pair of the X-rails 19 are fixed on the bottom face of the Y-moving beam 18, so they face the base 10.

Figure 6:
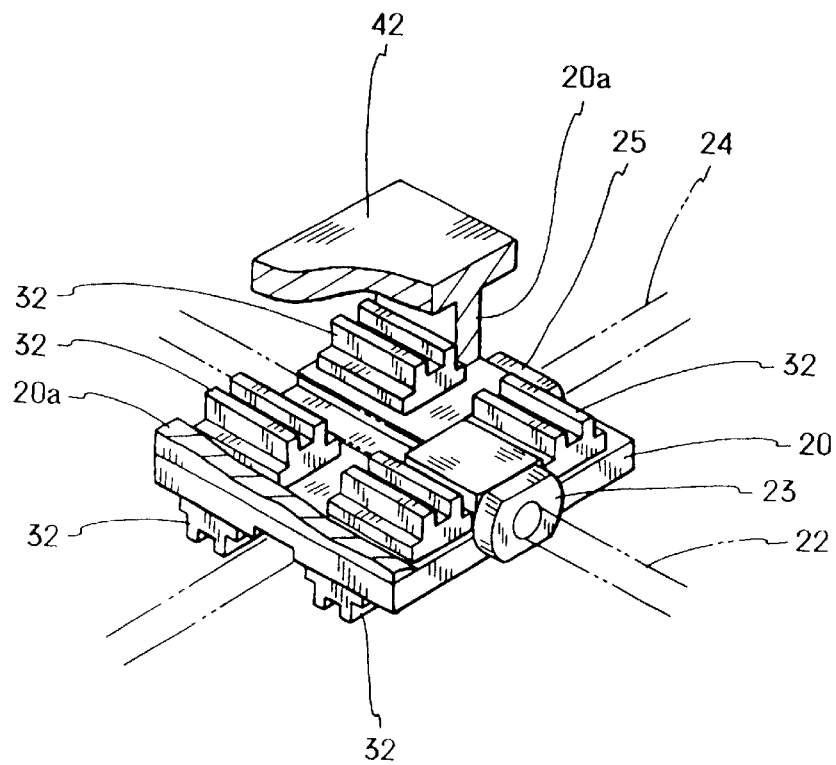
FIG. 6 is a perspective view of a slider of the embodiment shown in FIG. 1.

As shown in FIG. 6 (the perspective view of the slider 20), the moving blocks 32, which are slidably connected with the Y-rails 17 of the X-moving beam 16, are provided on the bottom face of the slider 20, so they face the base 10; the moving blocks 32, which are slidably connected with the X-rails 19 of the Y-moving beam 18, are provided on the upper face of the slider 20, so they do not face the base 10. Note that, two moving blocks 32, which are serially arranged, are provided for each of the rails (the rails 36 of the linear guides 31), and they are fixed to the slider 20.

Since the rails 36 of the linear guides 31 are provided as the rails for the slider 20 and the moving blocks 32 are fixed to the slider 20, the Y-moving beam 18 is inverted with respect to the X-moving beam 16.

With this structure, thickness of the piled elements (the X- and Y-ball screws 22 and 24, the Y-rails 17 of the X-moving beam 16 and the X-rails 19 of the Y-moving beam 18) can be thinner. Acting points of driving force can be made close in the X- and Y-directions, so that the bad influence of the moment can be reduced and the inertia reductively and the positioning accuracy can be improved. Further, the size of the drive system can be smaller.

Note that, in the present embodiment, two Y-rails 17 and two X-rails 19 are employed, but number of the rails 17 and 19 are not limited to two. By increasing number of the rails 17 and 19, the linearity of the slider 20 can be higher.

Adjusting blocks 18a are respectively fixed to both ends of the Y-moving beam 18 so as to locate the Y-moving beam 18 above the X-moving beam 16 (see FIGS. 2 and 3). The Y-moving beam 18 is spanned between the upper faces of the adjusting blocks 18a; two moving blocks 32 are serially fixed on the bottom face of each of the adjusting blocks 18a.

A top table 42 is fixed on the slider 20 with the supporting wall sections 20a, which are fixed on the slider 20. The Y-moving beam 18 is passed through a space enclosed by inner faces of the supporting wall sections 20a, a bottom face of the top table 42 and the upper face of the slider 20.

The two dimensional drive system of the present embodiment has: an X-synchronizing means for synchronously moving the both ends of the X-moving beam 16 along the X-fixed guides 12; and a Y-synchronizing means for synchronously moving the both ends of the Y-moving beam 18 along the Y-fixed guides 14. By the synchronizing means, the positioning accuracy, the inertia reductively, etc. can be improved even if the drive system is large and heavy.

Figure 10:
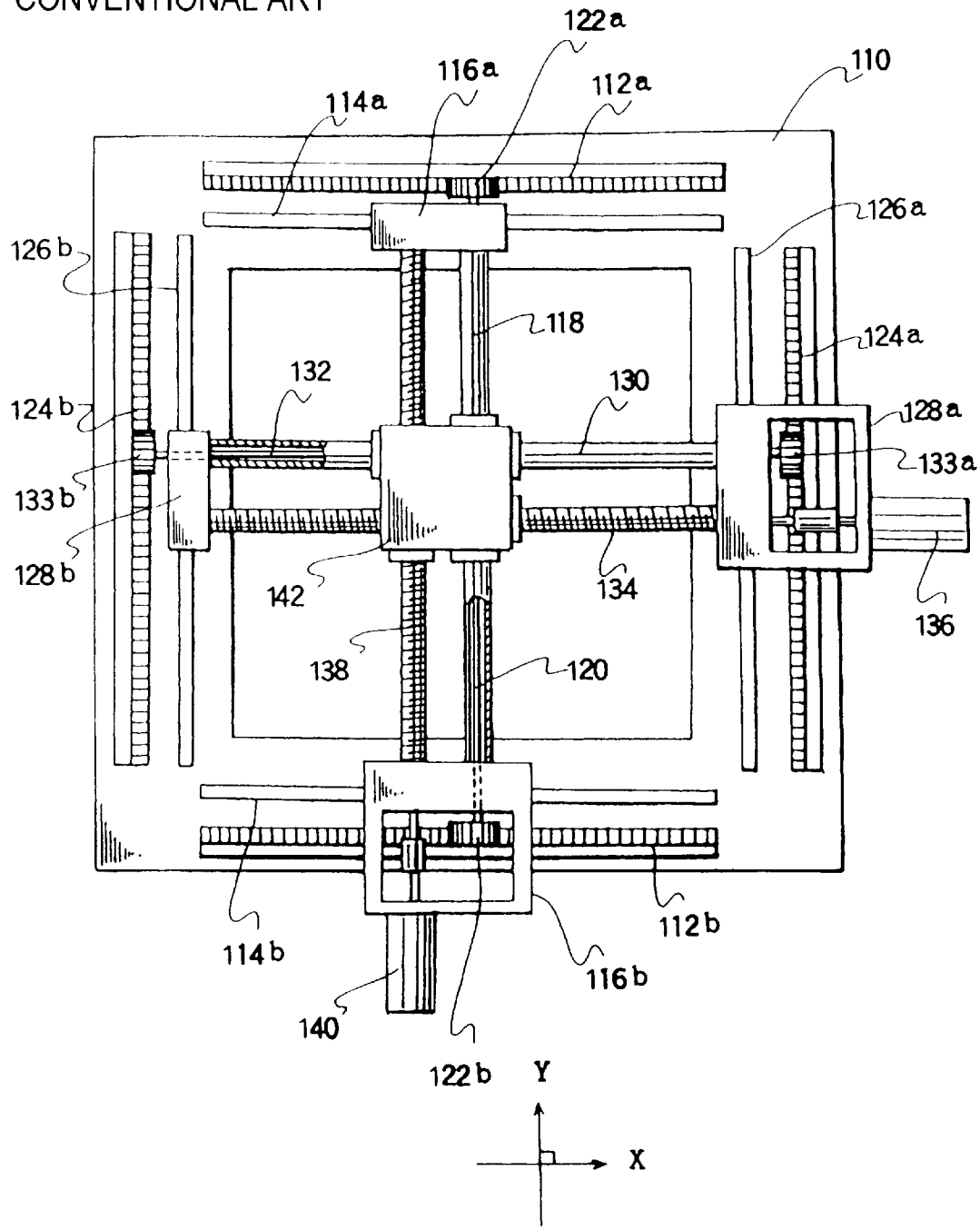
FIG. 10 is a plan view of the conventional two dimensional drive system.

Various types of the synchronizing means can be employed. The racks and pinion gears shown in FIG. 10, for example, may be employed as the synchronizing means.

Figure 9:
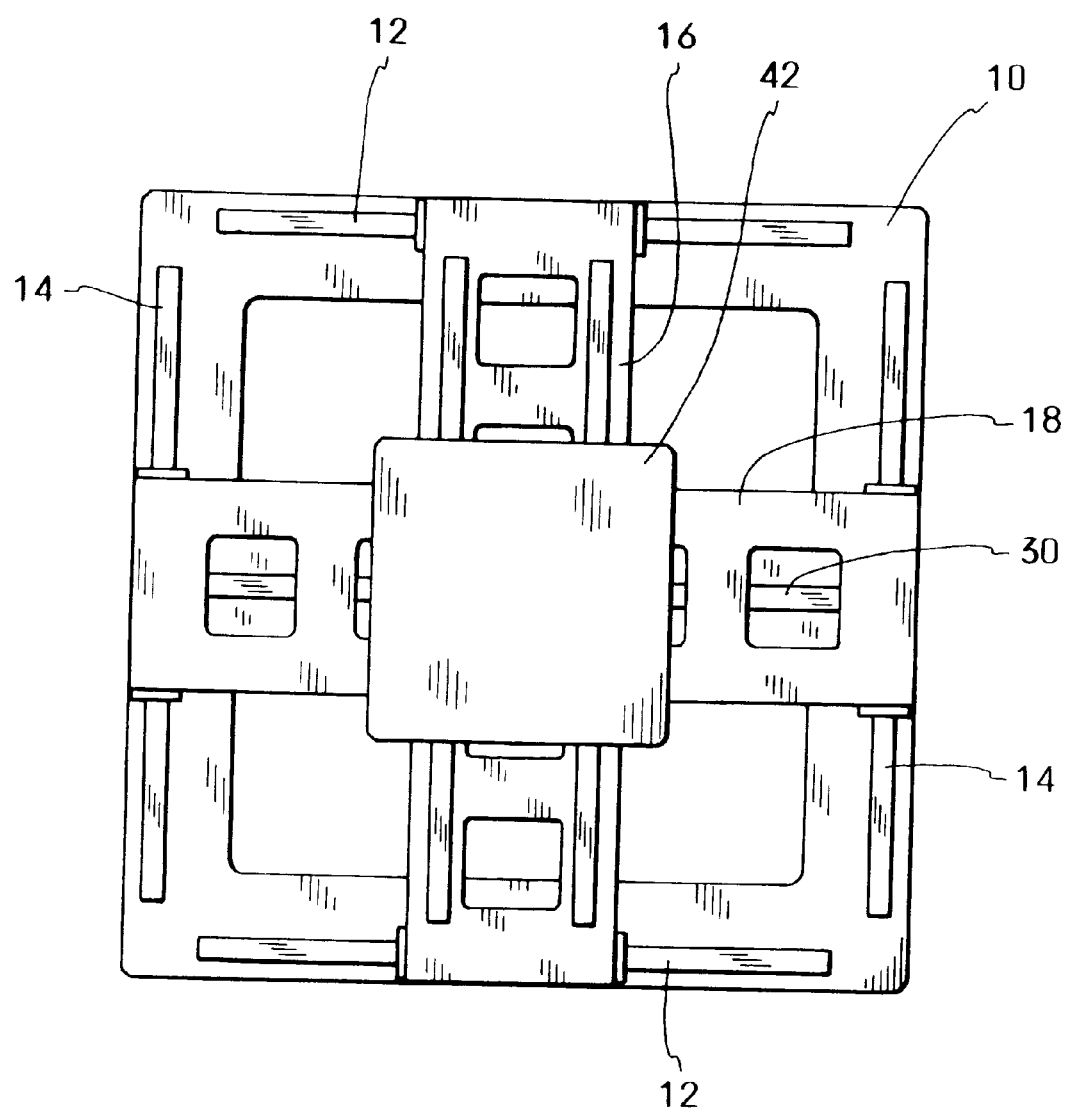
FIG. 9 is a plan view of another embodiment of the two dimensional drive system of the present invention.

Another embodiment of the two dimensional drive system of the present invention is shown in FIG. 9.

A working plate 42 is attached to the slider 20, so that the plate can be moved in a plane.

Unlike the above described embodiment, no ball screws are assembled. Other structural elements are used in the above described embodiments, so explanation will be omitted.

In the present embodiment too, the weight of the slider 20 and the load applied to the slider 20 can be properly received and supported. Further, the linear guides 31 improve the linearity.

In the above described embodiments, the X-Y table and the working plate 42 are attached to the horizontal slider 20 facing upward, but the present invention is not limited to the horizontal slider, so the slider may be faced downward or sideward.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein

What is claimed is:

1. A twodimensional drive system comprising:

a base;

a pair of first fixed guides being fixed to said base and arranged parallel in a first direction;

a pair of second fixed guides being fixed to said base and arranged parallel in a second direction perpendicular to the first direction;

a first moving beam being parallel to said second fixed guides, both ends of said first moving beam being respectively slidably connected to said first fixed guides, whereby said first moving beam can be moved in the first direction;

a second moving beam being parallel to said first fixed guides, said second moving beam being located on an outer side of said first moving beam with respect to said base, both ends of said second moving beam being respectively slidably connected to said second fixed guides, whereby said second moving beam can be moved in the second direction;

a slider being located on the outer side of said first moving beam with respect to said base, said slider being slidably connected to said first and second moving beams, whereby said slider can be moved, in the second direction, along said first moving beam and moved, in the first direction, along said second moving beam;

a first ball screw being spinally provided to said second moving beam and arranged in the first direction, said first ball screw being screwed with said slider so as to move said slider in first direction;

a second ball screw being spinnably provided to said first moving beam and arranged in the second direction, said second ball screw being screwed with said slider so as to move said slider in second direction;

first driving means for spinning said first ball screw;

second driving means for spinning said second ball screw; and a third fixed guide being fixed to said base, said third fixed guide being arranged parallel to and between said first fixed guides, said third fixed guide being located on the inner side of said first moving beam with respect to said base and slidably connected to said first moving beam, whereby said third fixed guide guides said first moving beam in the first direction.

2. The two dimensional drive system according to claim 1, further comprising:

first connecting means for slidably connecting said first moving beam with said first fixed guides and said third fixed guide; and second connecting means for slidably connecting said second moving beam with said second fixed guides, wherein said connecting means are linear guides, each of which includes a linear rail, a moving block being moved along the linear rail and a plurality of balls being provided between the linear rail and the moving block so as to precisely move the moving block, and wherein said fixed guides act as the linear rails of the linear guides, and the moving blocks are respectively fixed to said moving beams.

3. The two dimensional drive system according to claim 1, wherein a plurality of said third fixed guides are provided between said first fixed guides.

4. The two dimensional drive system according to claim 1, wherein a connecting mechanism, which slidably connects said first and second moving beams with said slider, includes:

a first rail section being provided on one face of said first moving beam, which faces opposite direction with respect to a face facing said base, said first rail section being extended in the second direction;

a second rail section being provided on one face of said second moving beam, which faces said base, said second rail section being extended in the first direction;

a first connecting section being provided on one face of said slider, which faces said base, said first connecting section being connected with said first rail section; and a second connecting section being provided on one face of said slider, which faces opposite direction with respect to a face facing said base, said second connecting section being connected with said second rail section.

5. The two dimensional drive system according to claim 1, further comprising:

connecting means for slidably connecting said first and second moving beams with said slider, wherein said connecting means is a linear guide, which includes a first linear rail, a second liner rail, a moving block being moved along the linear rails and a plurality of balls being provided between the linear rails and the moving block so as to precisely move the moving block, and wherein the first rail is fixed to said first moving beam and extended in the second direction, the second rail is fixed to said second moving beam and extended in the first direction, and the moving block is fixed to said slider and connected to the linear rails.

6. The two-dimensional drive system according to claim 1, further comprising:
first synchronizing means for synchronizing movement of the both ends of said first moving beam along the first fixed guides; and
second synchronizing means for synchronizing movement of the both ends of said second moving beam along the second fixed guides.

7. The two dimensional drive system according to claim 1, further comprising an X–Y table, whose top table is fixed to an upper part of said slider, which is located above said base and capable of moving in the first and second directions.

8. A two dimensional drive system comprising:

a base;

a pair of first fixed guides being fixed to said base and arranged parallel in a first direction;

a pair of second fixed guides being fixed to said base and arranged parallel in a second direction perpendicular to the first direction;

a first moving beam being parallel to said second fixed guides, both ends of said first moving beam being respectively slidably connected to said first fixed guides, whereby said first moving beam can be moved in the first direction;

a second moving beam being parallel to said first fixed guides, said second moving beam being located on an outer side of said first moving beam with respect to said base, both ends of said second moving beam being respectively slidably connected to said second fixed guides, whereby said second moving beam can be moved in the second direction;

a slider being located on the outer side of said first moving beam with respect to said base, said slider being slidably connected to said first and second moving beams, whereby said slider can be moved, along said first and second moving beams, in the first and second directions; and a third fixed guide being fixed to said base, said third fixed guide being arranged parallel to and between said first fixed guides, said third fixed guide being located on the inner side of said first moving beam with respect to said base and slidably connected to said first moving beam, whereby said third fixed guide guides said first moving beam in the first direction, connecting means for slidably connecting said first and second moving beams, wherein said connecting means are linear guides, each of which includes a linear rail, a moving block being moved along the linear rail and a plurality of balls being provided between the linear rail and the moving block so as to precisely move the moving block, and wherein said fixed guides act as the linear rails of the linear guides, and the moving blocks are respectively fixed to said moving beams.

9. The two dimensional drive system according to claim 8, wherein a plurality of said third fixed guides are provided between said first fixed guides.

10. The two dimensional drive system according to claim 8, wherein a connecting mechanism, which slidably connects said first and second moving beams with said slider, includes:
a first rail section being provided on one face of said first moving beam, which faces opposite direction with respect to a face facing said base, said first rail section being extended in the second direction;
a second rail section being provided on one face of said second moving beam, which faces said base, said second rail section being extended in the first direction;
a first connecting section being provided on one face of said slider, which faces said base, said first connecting section being connected with said first rail section; and
a second connecting section being provided on one face of said slider, which faces opposite direction with respect to a face facing said base, said second connecting section being connected with said second rail section.

11. The two dimensional drive system according to claim 8, further comprising:
connecting means for slidably connecting said first and second moving beams with said slider,
wherein said connecting means is a linear guide, which includes a first linear rail, a second liner rail, a moving block being moved along the linear rails and a plurality of balls being provided between the linear rails and the moving block so as to precisely move the moving block, and
wherein the first rail is fixed to said first moving beam and extended in the second direction, the second rail is fixed to said second moving beam and extended in the first direction, and the moving block is fixed to said slider and connected to the linear rails.

12. The two dimensional drive system according to claim 8, further comprising:
first synchronizing means for synchronizing movement of the both ends of said first moving beam along the first fixed guides; and
second synchronizing means for synchronizing movement of the both ends of said second moving beam along the second fixed guides.

13. The two dimensional drive system according to claim 8, further comprising an X–Y table, whose top table is fixed to an upper part of said slider, which is located above said base and capable of moving in the first and second directions.

* * * * *